(12) United States Patent
Kubota et al.

(10) Patent No.: US 11,264,666 B2
(45) Date of Patent: Mar. 1, 2022

(54) ASSEMBLED BATTERY

(71) Applicant: HITACHI AUTOMOTIVE SYSTEMS, LTD., Ibaraki (JP)

(72) Inventors: Osamu Kubota, Tokyo (JP); Kazunori Ojima, Hitachinaka (JP); Sadayuki Aoki, Hitachinaka (JP)

(73) Assignee: VEHICLE ENERGY JAPAN, INC., Ibaraki (JP)

( * ) Notice: Subject to any disclaimer, the term of this patent is extended or adjusted under 35 U.S.C. 154(b) by 471 days.

(21) Appl. No.: 16/330,689

(22) PCT Filed: Aug. 4, 2017

(86) PCT No.: PCT/JP2017/028348
§ 371 (c)(1),
(2) Date: Mar. 5, 2019

(87) PCT Pub. No.: WO2018/061477
PCT Pub. Date: Apr. 5, 2018

(65) Prior Publication Data
US 2021/0305646 A1    Sep. 30, 2021

(30) Foreign Application Priority Data

Sep. 30, 2016  (JP) .............................. JP2016-194553

(51) Int. Cl.
*H01M 50/172* (2021.01)
*H01M 50/502* (2021.01)
*H01M 50/543* (2021.01)

(52) U.S. Cl.
CPC ....... *H01M 50/172* (2021.01); *H01M 50/502* (2021.01); *H01M 50/543* (2021.01)

(58) Field of Classification Search
None
See application file for complete search history.

(56) References Cited

U.S. PATENT DOCUMENTS

2010/0081041 A1    4/2010  Okada et al.
2014/0349164 A1   11/2014  Park et al.
(Continued)

FOREIGN PATENT DOCUMENTS

JP    2010-080353 A    4/2010
JP    2013-200976 A   10/2013
(Continued)

OTHER PUBLICATIONS

Chinese Office Action dated Mar. 29, 2021 for Chinese Patent Application No. 201780042939.6.
(Continued)

*Primary Examiner* — Carmen V Lyles-Irving
(74) *Attorney, Agent, or Firm* — Volpe Koenig

(57) ABSTRACT

Provided is an assembled battery which is downsized and in which a fastening force between a busbar and an external terminal cable at a fixing part is improved. Provided is an assembled battery including: a group of cells in which a plurality of cells, each having electrode terminals, is stacked; plate-shaped members arranged at ends of the group of cells; and cell holders arranged between the plate-shaped members and the group of cells, in which each of the cell holders is provided with a terminal fixing part of the assembled battery, and each of the plate-shaped members has a fitting part to be fitted to the terminal fixing part.

7 Claims, 9 Drawing Sheets

(56) References Cited

U.S. PATENT DOCUMENTS

2016/0013467 A1    1/2016  Kawata et al.
2016/0372796 A1   12/2016  Nishihara
2017/0194677 A1*   7/2017  Oishi .................. H01M 10/647

FOREIGN PATENT DOCUMENTS

| JP | 2014-229615 A | 12/2014 |
| JP | 2015-156303 A | 8/2015 |
| JP | 2016-018766 A | 2/2016 |
| JP | 2016-046234 A | 4/2016 |
| JP | 2017-117574 A | 6/2017 |
| WO | 2015/107583 A1 | 7/2015 |

OTHER PUBLICATIONS

International Search Report for PCT/2017/028348, dated Oct. 3, 2017.
Extended European Search Report dated Apr. 9, 2020 for the European Patent Application No. 17855435.8.

* cited by examiner

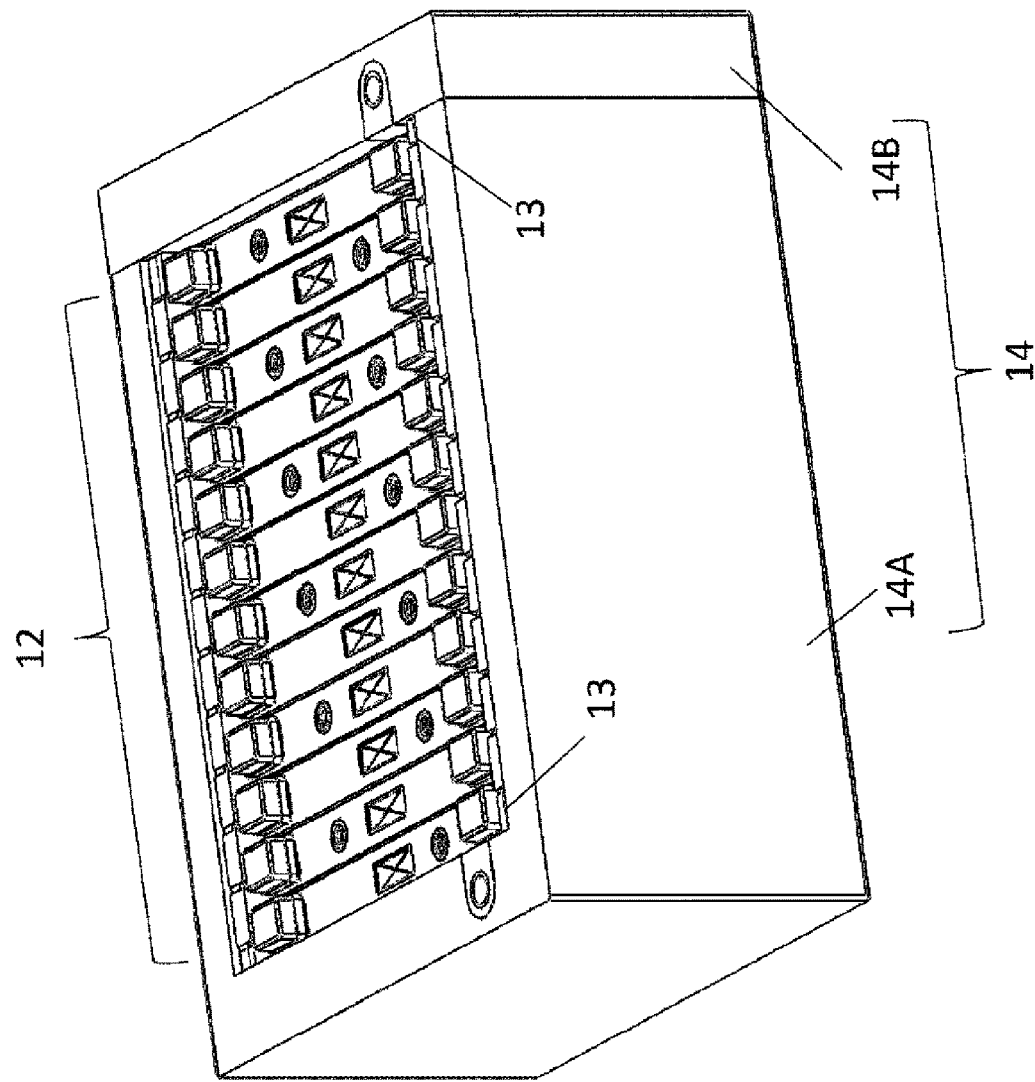

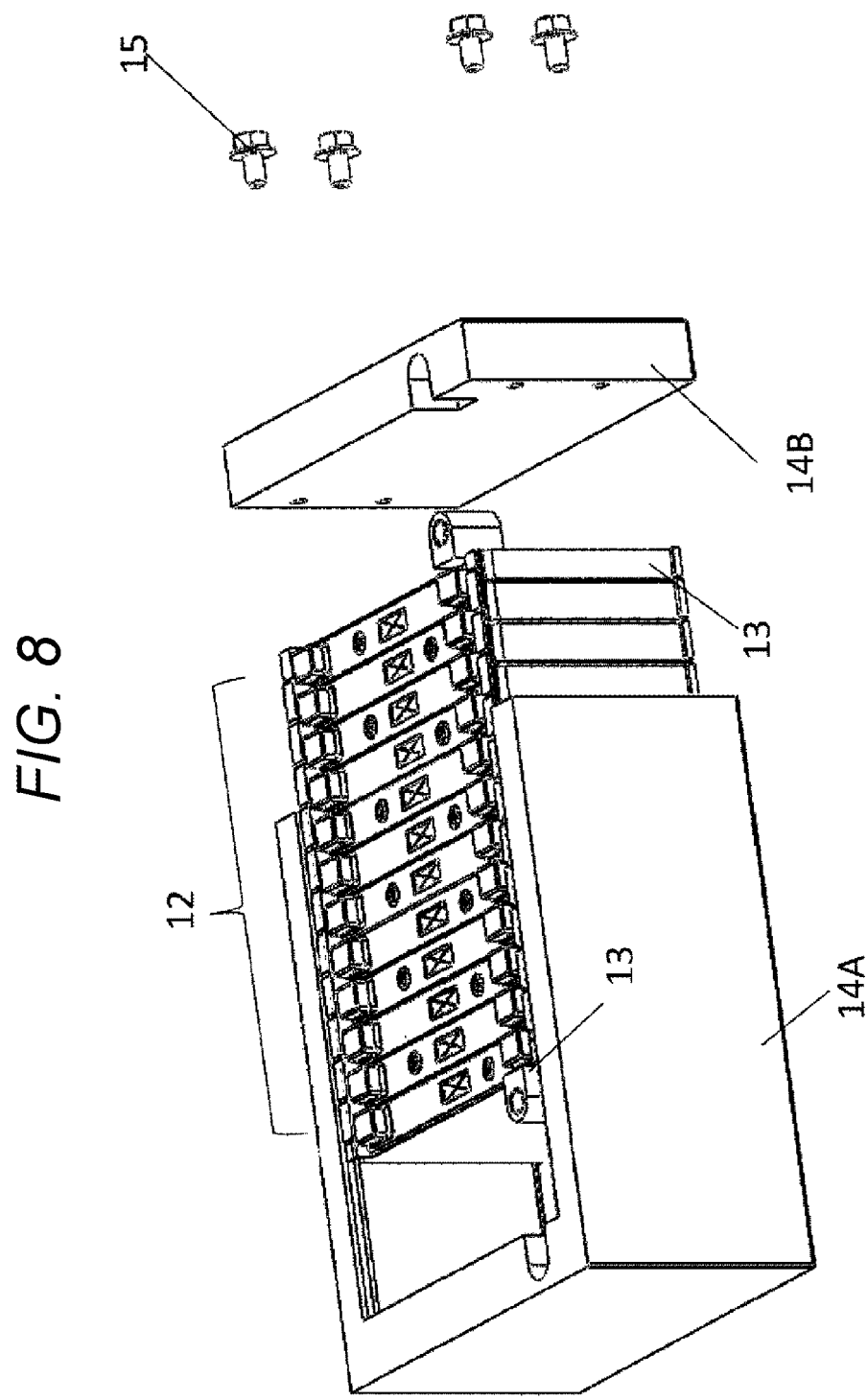

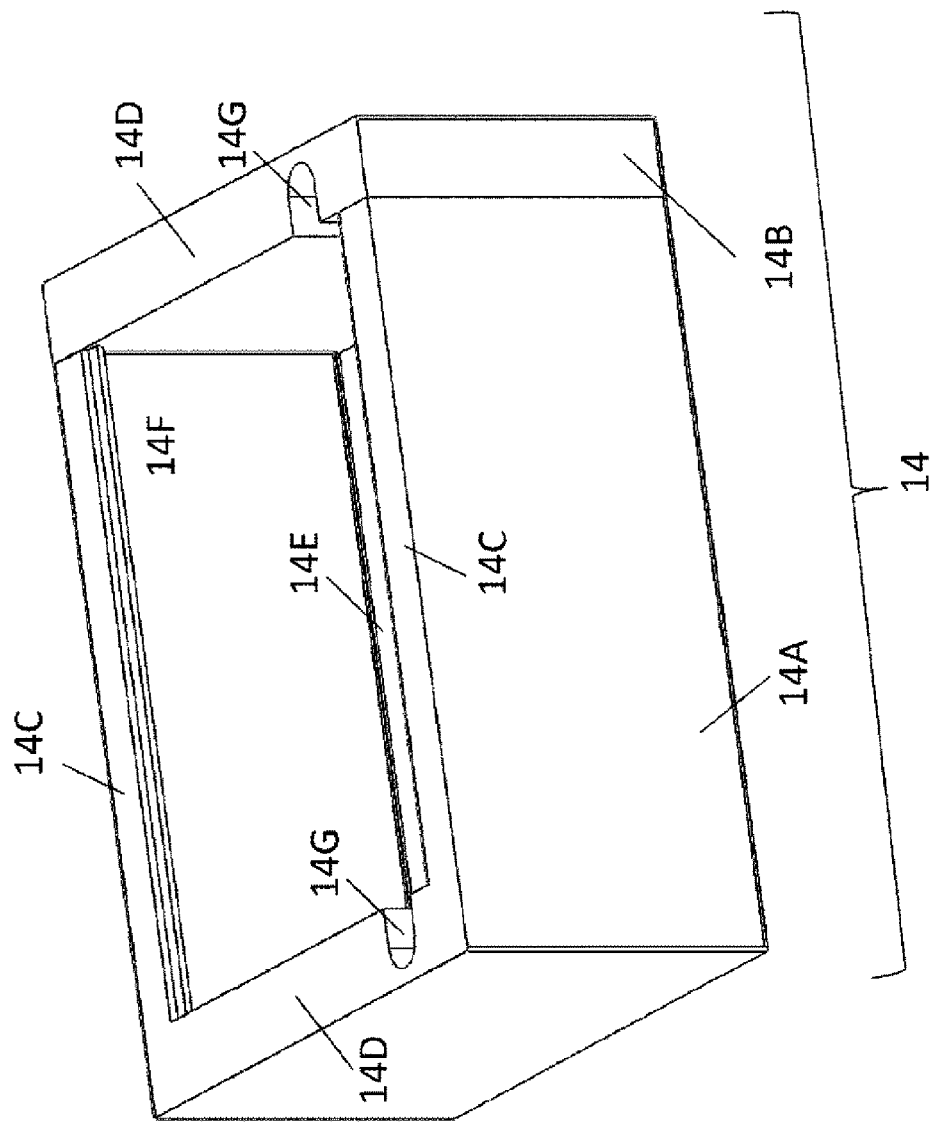

ASSEMBLED BATTERY

TECHNICAL FIELD

The present invention relates to an assembled battery including multiple rechargeable batteries which can be recharged and discharged repeatedly and are connected to each other.

BACKGROUND ART

In recent years, development of assembled batteries in which multiple lithium ion batteries are connected is in process especially for use of charging/discharging with a large current such as a power supply device of hybrid vehicles. It is necessary that this assembled battery is connected with thick external terminal cables with a low resistance since a large current flows therethrough. For that purpose, external terminal cables are fastened and connected to the assembled battery with a strong fastening force. However, since an electrode terminal of a unit cell may be damaged by the fastening torque of connection when an external terminal cable is directly connected to a positive electrode terminal or a negative electrode terminal of the unit cell included in the assembled battery, a method is adopted in which a busbar is provided at an electrode terminal of the unit cell and the busbar and the external terminal cable are bolted to each other at a fixing part provided separately from the electrode terminal of the unit cell. The fixing part receives a force in the rotational direction with respect to the axis of the bolt. However, if the fixing part rotates by the force in the rotation direction, the fastening force of the bolt cannot be sufficient, and thus the magnitude of the fastening force of the bolt is dependent on the strength of the fixing part. Here, in order to secure the strength of the fixing part, a certain volume is required for the fixing part, which disadvantageously increases the size of the assembled battery.

PTL 1 discloses a structure in which a fixing part is integrated with an end plate made of resin.

CITATION LIST

Patent Literature

PTL 1: JP 2010-080353 A

SUMMARY OF INVENTION

Technical Problem

A fixing part is applied with a force in a rotational direction for fastening a busbar and an external terminal cable; however when the fixing part is subjected to this force and thereby deformed, the fastening force cannot be secured, and thus the fastening force is dependent on the strength of the fixing part. In an assembled battery described in PTL 1, a fixing part and an end plate are integrated to downsize the assembled battery. However, since the fastening force is received only by the strength of the member made of resin, there still remains a challenge for the fastening force.

The present invention has been made in view of the above problem, and it is an object of the present invention to provide an assembled battery in which the fastening force between a busbar and an external terminal cable at a fixing part is improved while downsizing the assembled battery.

Solution to Problem

In order to achieve the above object, the present invention provides an assembled battery including: a group of cells in which a plurality of cells, each having electrode terminals, is stacked; plate-shaped members arranged at ends of the group of cells; and cell holders arranged between the plate-shaped members and the group of cells, in which each of the cell holders is provided with a terminal fixing part of the assembled battery, and each of the plate-shaped members has a fitting part to be fitted to the terminal fixing part.

Advantageous Effects of Invention

According to the present invention, it is possible to lower the height of the assembled battery by lowering the position of the fixing part having a certain volume toward a bottom of a can and to further reduce the length in the longitudinal direction of the assembled battery by utilizing the thickness of the end plates to accommodate the volume of the fixing parts. These together allow the assembled battery to be downsized.

Furthermore, allowing the fitting parts of the plate-shaped members to surround the terminal fixing parts of the cell holders allows the end plates to receive the force in the rotational direction applied to the fixing parts, thereby enabling an increase in the strength of the fixing parts and improvement of the fastening force between a busbar and an external terminal cable at the fixing part.

BRIEF DESCRIPTION OF DRAWINGS

FIG. 7 is an external perspective view illustrating an assembled battery according to a second embodiment.

FIG. 8 is an exploded external perspective view illustrating the assembled battery according to the second embodiment.

FIG. 9 is an external perspective view illustrating an assembled battery housing.

DESCRIPTION OF EMBODIMENTS

Figure 1:
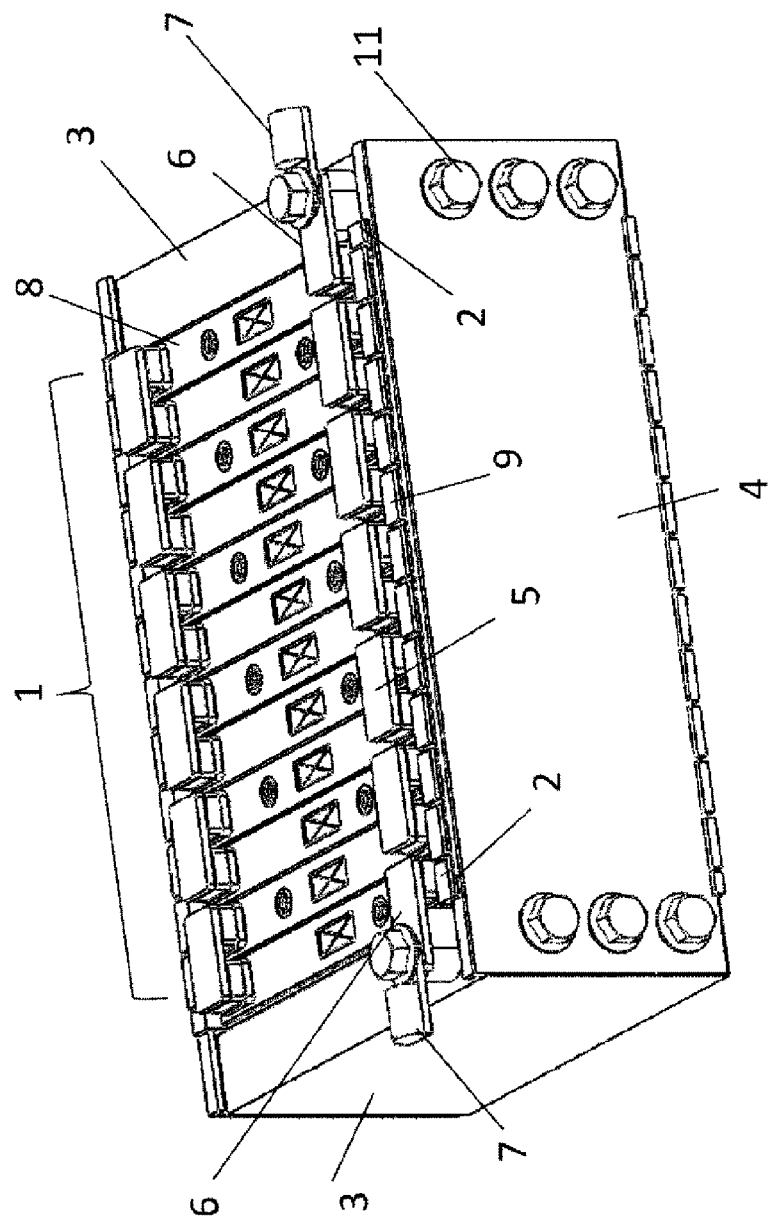
FIG. 1 is an external perspective view illustrating an assembled battery according to a first embodiment.

Preferred embodiments for carrying out the present invention will be described below with specific examples with reference to the accompanying drawings; however, the present invention is not limited thereto, and other embodiments conceivable within the scope of the technical idea of the present invention are also included within the scope of the present invention. Moreover, the drawings in the embodiments are schematic diagrams, and the accuracy is not guaranteed for the positional relationships, dimensions, etc.

in the drawing. Various variations and modifications by those skilled in the art are possible within the scope of the technical idea disclosed herein. Incidentally, in all the drawings for explaining the present invention, components having the same function are denoted by the same symbol, and descriptions thereof are not repeated.

First Embodiment

Figure 2:
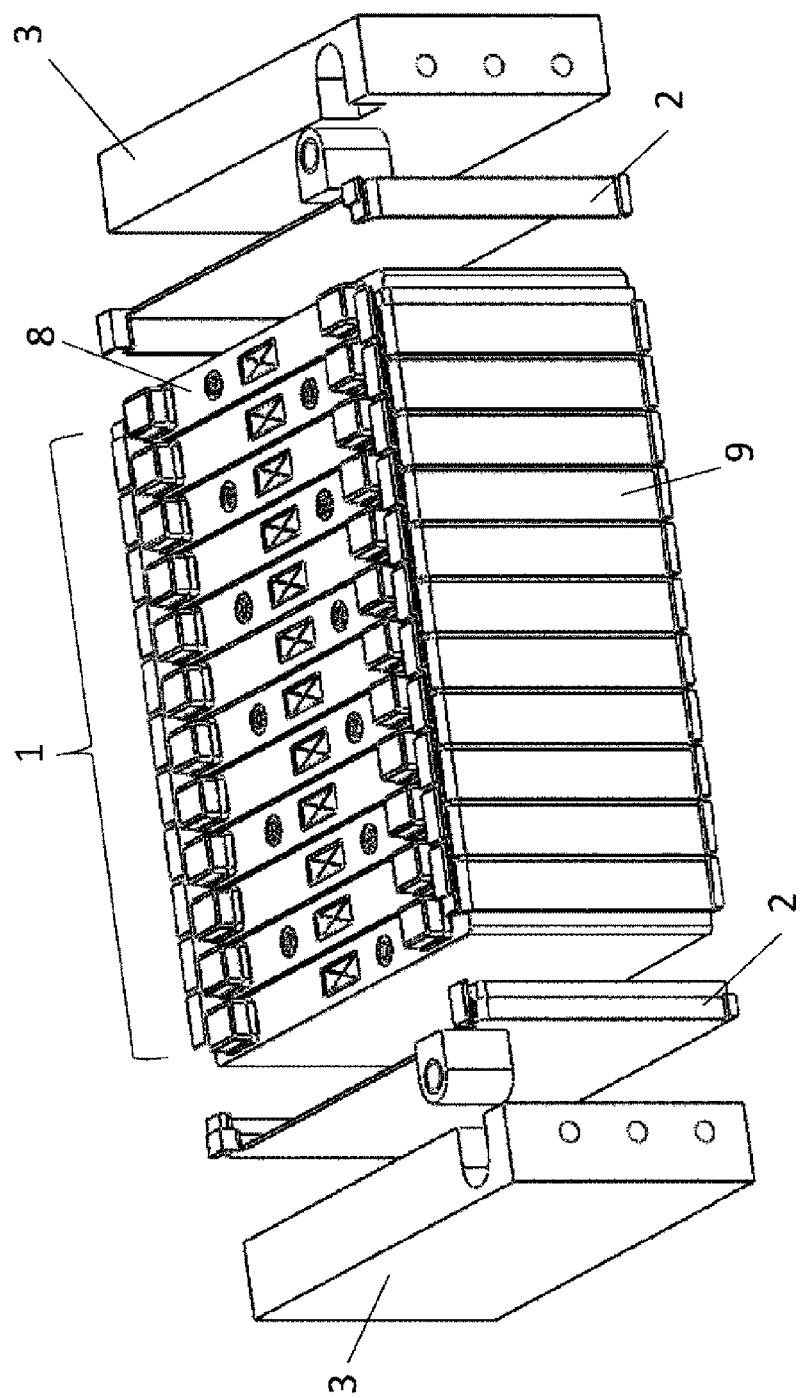
FIG. 2 is an exploded external perspective view illustrating the assembled battery according to the first embodiment.

FIG. 1 is an external perspective view of an assembled battery according to a first embodiment of the present invention. FIG. 2 is an exploded external perspective view of the assembled battery of FIG. 1. Note that FIG. 2 is partially omitted.

In the assembled battery illustrated in FIG. 1, a cell stack 1 is sandwiched between a pair of end holders 2 and between a pair of end plates 3 which are plate-shaped members, which are all integrated with a pair of side frames 4, with intermediate busbars 5 forming a power line among cells and end busbars 6 and external terminal cables 7 forming a power line between the assembled battery and the outside thereof.

The cell stack will be described with reference to FIGS. 1 and 2. The cell stack 1 includes a plurality of unit cells 8 and the plurality of intermediate holders 9. Each of the unit cells 8 has a flat rectangular parallelepiped shape and has a pair of wide surfaces. The plurality of unit cells 8 included in the cell stack is stacked and arranged such that wide surfaces of adjacent unit cells 8 face each other. Adjacent unit cells 8 are arranged in reversed directions such that positions of a positive electrode terminal and a negative electrode terminal provided on each cell lid are reversed. Each pair of a positive electrode terminal and a negative electrode terminal of adjacent unit cells 8 is electrically connected by an intermediate busbar 5 which is a flat conductive member made of metal. That is, the plurality of unit cells 8 included in the assembled battery according to the present embodiment is electrically connected in series. Moreover, an end busbar 6 is provided at a positive electrode terminal or a negative electrode terminal of the unit cells 8 at both ends of the cell stack.

A unit cell 8 included in the cell stack 1 will be described. Each of the plurality of unit cells 8 has the same structure. A unit cell 8 includes a square cell container consisting of a cell can and a cell lid. A material of the cell can and the cell lid may be, for example, aluminum or an aluminum alloy. A cell can have a shape of a rectangular box having two surfaces with large areas (wide surfaces), two surfaces with small areas (narrow side surfaces), one bottom plate, and an opening. A cell lid has a rectangular flat plate shape and is laser welded so as to close the opening of the cell can. That is, the cell lid seals the cell can. The square cell container consisting of the cell lid and the cell can has a hollow rectangular parallelepiped shape.

The cell lid is provided with a positive electrode terminal and a negative electrode terminal. Inside the cell container, a charge/discharge element is housed while covered with an insulating case. A positive electrode of the charge/discharge element is connected to a positive electrode terminal, and a negative electrode of the charge/discharge element is connected to a negative electrode terminal. The cell lid is drilled and formed with an injection hole for injecting electrolytic solution into the cell container. The injection hole is sealed with a liquid stopper after injection of the electrolytic solution. As the electrolytic solution, for example, a non-aqueous electrolyte in which a lithium salt such as lithium hexafluorophosphate (LiPF6) is dissolved in a carbonic acid ester-based organic solvent such as ethylene carbonate can be used. The cell lid is provided with a gas discharge valve. The gas discharge valve is formed by partially thinning the cell lid by press working. The gas discharge valve opens, when gas is generated by heat generation due to an abnormality in the unit cell 8 such as overcharge and the pressure inside the cell container rises and reaches a predetermined pressure, to discharge the gas from the inside and thereby reduces the pressure inside the cell container.

Figure 3:
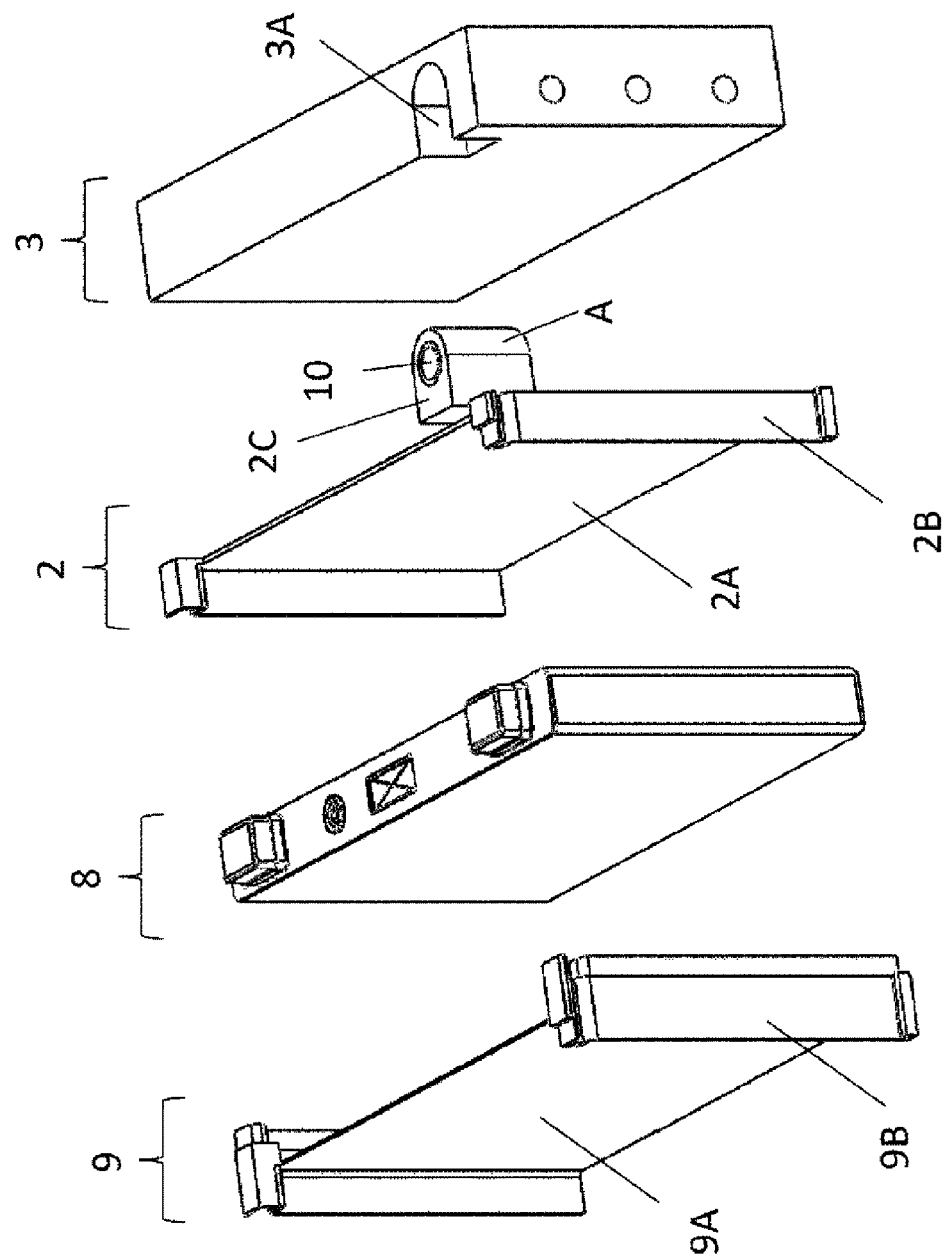
FIG. 3 is a partial perspective view for explaining the positional relationship among an intermediate holder, an end holder, an end cell, and an end plate.

FIG. 3 is a partial perspective view for explaining the positional relationship among an intermediate holder 9, an end holder 2, a unit cells 8 located at an end of the cell stack, and an end plate 3. The intermediate holder 9, the end holder 2, and the end plate 3 will be described with reference to the drawing.

A plurality of intermediate holders 9 is stacked in the longitudinal direction of the cell stack. The material of the intermediate holder 9 is a resin having insulation properties and heat resistance, for example, engineering plastics such as polybutylene terephthalate (PBT) and polycarbonate (PC) or rubber. Since each of the intermediate holders 9 is interposed between the unit cells 8, the insulation property is secured between adjacent unit cells 8. An intermediate holder 9 has an isolation part 9A and a connection part 9B. The isolation part 9A faces a wide surface of a cell and prevents wide surfaces of two adjacent cells from coming into contact with each other. The connection part 9B has a ridge part and a valley part and is used for connecting an adjacent intermediate holder 9 and the end holder 2 which will be described later.

The end holder 2 is arranged between the unit cell 8 arranged at the front end of the cell stack and the end plate 3 and between the unit cell 8 arranged at the rear end and the end plate 3. Since the end holders 2 are each interposed between each pair of the unit cells 8 and the end plates 3, the insulation property between the end plates and the unit cells 8 is secured.

The end holder 2 has an isolation part 2A, a connection part 2B, and a fixing part 2C. The isolation part 2A faces the wide surface of the cell and the end plate and prevents the wide surface of the cell and the end plate from coming into contact with each other. The connection part 2B has a ridge part and a valley part and is used for connection with the adjacent intermediate holder.

The fixing part 2C protrudes from the end holder 2 toward the end plate 3. The fixing part 2C is a part for fastening and electrically connecting the end busbar and the external terminal cable and is integrated with an insert nut 10 or an insert bolt. The fixing part is structured to be inserted in an accommodating part 3A of the end plate 3, which will be described later, and transfers the rotational torque applied to the fixing part when the end busbar and the external terminal cable are fastened, which ensures stability of the fixing part.

Adjacent intermediate holders or an intermediate holder 9 and an end holder 2 are connected by fitting connection parts of the respective holders. Specifically, fitting a connection part 9B of an intermediate holder 9 and a connection part 9B of an adjacent intermediate holder 9 results in connection of the adjacent intermediate holders, and fitting a connection part 9B of an intermediate holder 9 and a connection part 2B of an end holder 2 results in connection of the intermediate holder 9 and the end holder 2.

The end plate 3 has a rectangular flat plate shape and is formed to have substantially the same size as that of the unit cell 8. The end plates are each arranged at the front and the rear in the stacking direction of the cell stack and sandwich the cell stack via the pair of end holders 2. The accommodating part 3A has such a shape as a top surface of the end plate being recessed, with a part of the recess open to the end holder side. The shape of the accommodating part 3A is substantially the same as the shape of the fixing part 2C. Note that the material of the end plate is a metal such as aluminum or an aluminum alloy.

Figure 4:
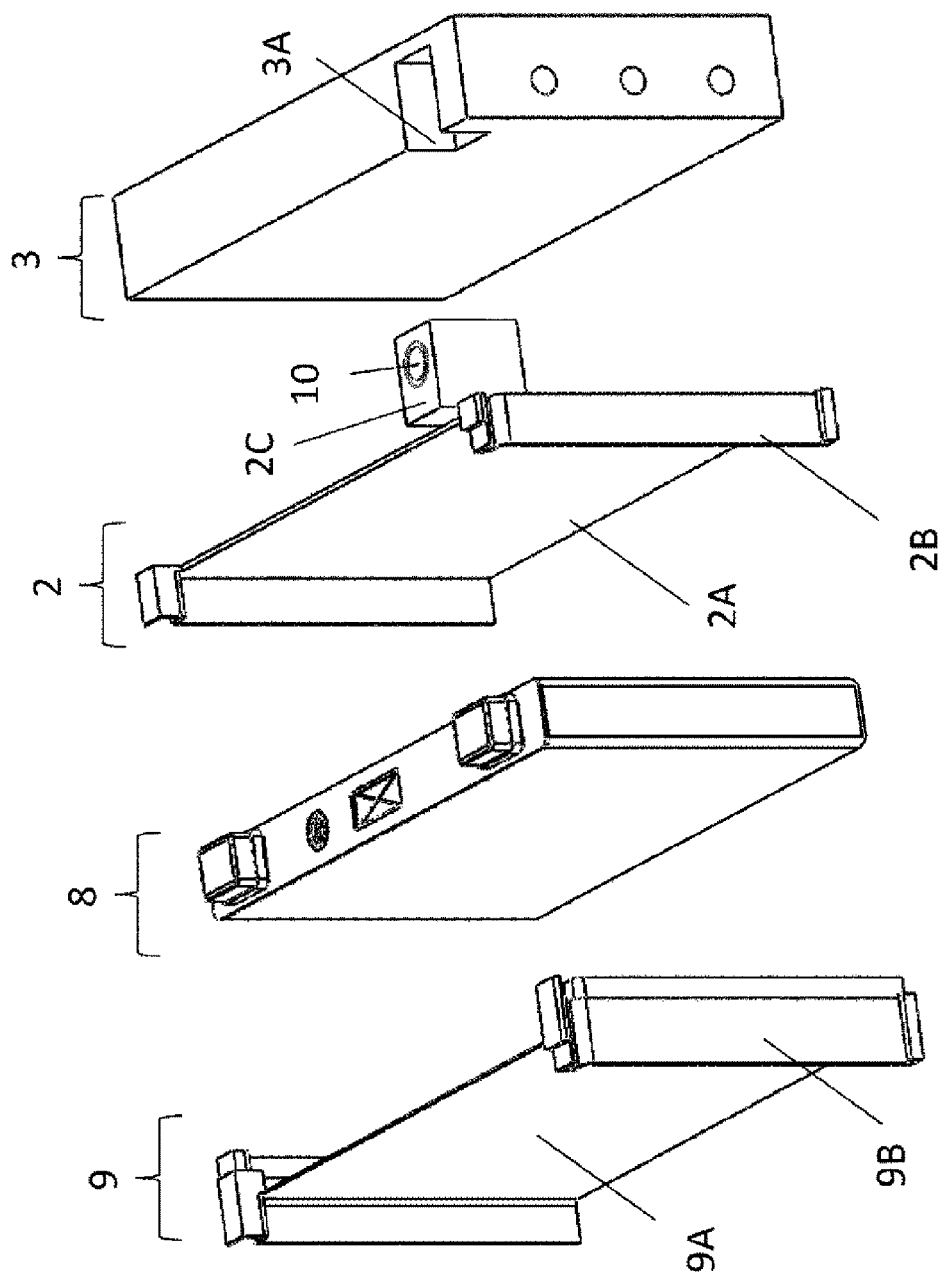
FIG. 4 is a partial perspective view for explaining the positional relationship among an intermediate holder, an end holder, an end cell, and an end plate.
Figure 5:
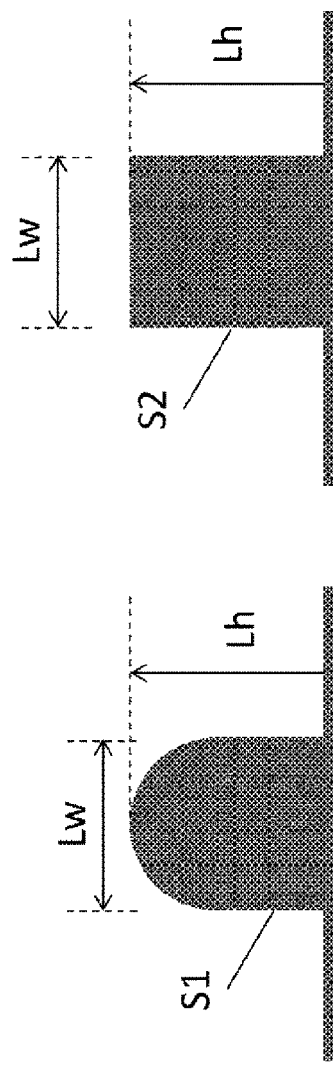
FIG. 5 is a conceptual diagram for explaining a difference between a case of a fixing part having a curved surface and a case of a fixing part having a rectangular shape.
Figure 6:
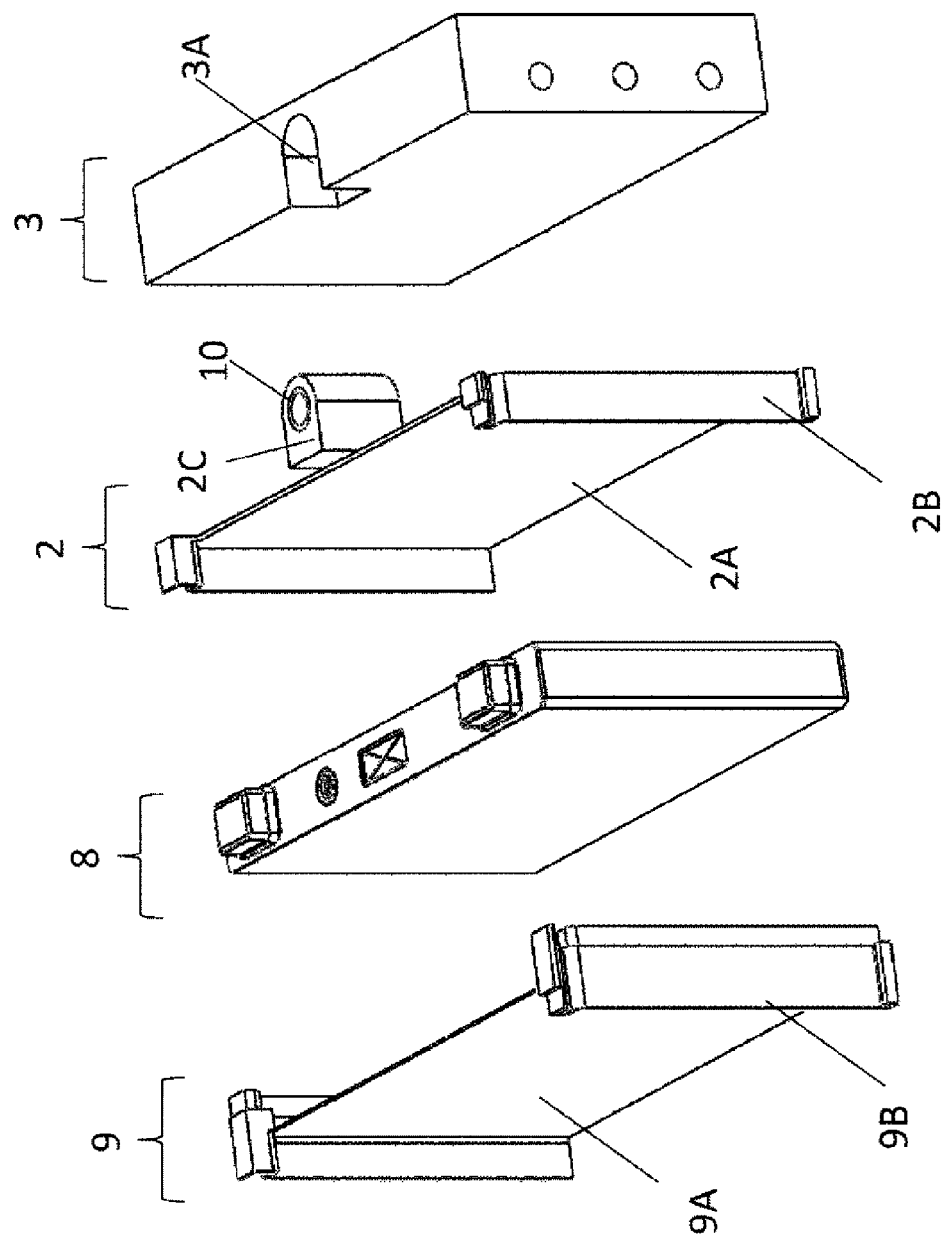
FIG. 6 is a partial perspective view for explaining the positional relationship among an intermediate holder, an end holder, an end cell, and an end plate.

Another shape of the end holder 2 and the end plate will be described with reference to FIGS. 4 to 6.

The shape of the fixing part of the end holder 2 is not limited. A curved surface A may be included as illustrated in FIG. 3, or a rectangular shape with no curved surface may be employed as illustrated in FIG. 4. However, in order to transfer the rotational torque at the time of fastening the end busbar and the external terminal cable by the end plate to strengthen the stability of the fixing part, it is preferable that the fixing part is a rectangle having no curved surface. This is because, as illustrated in FIG. 5, when a width Lw of the fixing part is equal to a protruding length Lh of the fixing part, a rectangular shape allows a larger contact area between the fixing part and the end plate. (S2>S1, where: S1 denotes a contact area in the case of a structure having a curved surface; and S2 denotes a contact area in the case of a rectangle.) In addition, the position of the fixing part is not limited and may be at a position facing an electrode terminal to be connected with the end busbar as illustrated in FIGS. 3 and 4 or as illustrated in FIG. 6, may be at a position in the center of two electrode terminals. In the case where the fixing part is provided at the former position, since the distance between the fixing part and the electrode terminal is short, the end busbar can be shortened to reduce the wiring resistance. Moreover, in the former case, in the case where the number of batteries included in the assembled battery is an even number, two types of end holders 2 are necessary. However, in the case of providing fixing parts at the latter position, only one type of shape can be employed for end holders 2.

The side frames 4 are arranged symmetrically on the left and right in the stacking direction of the cell stack. As illustrated in FIG. 1, the side frames 4 are physically connected by the pair of end plates 3 and bolts 11. The side frames 4 are manufactured by cutting a metal plate such as a stainless steel plate or a steel plate having a predetermined thickness into pieces having a predetermined width and then bending and working on details.

In order to integrate the cell stack 1, the end holders 2, and the end plates 3, the cell stack 1, together with the end holders 2, is sandwiched by the end plates 3 while the end holders 2 are in contact with the cell stack 1 in the front and rear in the stacking direction thereof, and then the side frames 4 are screwed to the end plates 3 by the bolts 11. When the side frames 4 are screwed to the end plates 3 by the bolts 11, the cell stack and the end cell holders 2 sandwiched between the pair of end plates are held in a state of being compressed by a predetermined amount. Note that, in the present embodiment, the method of fixing the side frames to the end plates using the bolts has been described; however, the side frames may be fixed to the end plates by rivets or by caulking, welding, or other means.

According to the present embodiment described above, the following operational effects can be achieved. In the present embodiment, since the fixing parts can be accommodated in the accommodating parts of the end plates, the assembled battery can be downsized. Moreover, since the rotary torque applied to the fixing parts can be received by the accommodating parts of the rigid end plates, the fastening force between an end busbar and an external terminal cable at the fixing part can be increased.

Second Embodiment

FIG. 7 is a schematic diagram illustrating an assembled battery according to a second embodiment of the present invention. FIG. 8 is an exploded external perspective view of the assembled battery of FIG. 7. The assembled battery according to the present embodiment has the same structure as that of the assembled battery according to the first embodiment except for the side frames and the end plates, and thus description will be given with reference to this figure, and overlapping description on the same structure will be omitted.

In the assembled battery illustrated in FIG. 7, a cell stack 12 is sandwiched between a pair of end holders 13, which are housed in an assembled battery housing 14. The assembled battery housing 14 is includes a large part 14A and a small part 14B.

As illustrated in FIG. 8, the assembled battery of the present embodiment is formed by sliding and inserting the cell stack 12 sandwiched by the end holders 13 into the large part 14A of the assembled battery housing 14 from a side thereof, placing the small part 14B to abut against one of the end holders 13, and then screwing the large part 14A and the small part 14B together by bolts 15.

FIG. 9 is an external perspective view of the assembled battery housing 14. In FIG. 9, the cell stack 12 and the end holders 13 are removed from FIG. 7 in order to explain the structure of the assembled battery housing 14. The assembled battery housing 14 has a rectangular box shape having two plate-shaped surfaces (longitudinal surfaces 12C) having large areas, two plate-shaped surfaces (lateral surfaces 12D) having small areas, one plate-shaped bottom 12E, and an opening 12F. The material of the assembled battery housing is not limited, but is a metal such as an aluminum alloy or a resin having rigidity such as a glass epoxy resin or a fiber reinforced plastic (FRP) resin.

The lateral surfaces 14D of the assembled battery housing each have an accommodating part 14G. The accommodating part 14G has such a shape as the inner side of the lateral surface 14D being recessed, and the shape can have a curved surface or be a rectangular in accordance with the shape of a fixing part to be accommodated in the accommodating part. Moreover, the position of the accommodating part may be provided at any position in accordance with the position of the fixing part.

According to the present embodiment described above, the following operational effects can be achieved. In the present embodiment, since the fixing parts can be accommodated in the accommodating parts of the robust housing, the assembled battery can be downsized with increased the mechanical strength of the assembled battery itself. Moreover, since the rotary torque applied to the fixing parts can be received by the accommodating parts of the rigid assembled battery housing, the fastening force between an end busbar and an external terminal cable at the fixing part can be increased.

Note that, in the present invention, the terminal fixing parts are provided on cell holders at positions facing external terminals of cells. This is to minimize the wiring distance and to reduce the wiring resistance. On the other hand, in the present invention, the positions of the terminal fixing parts are not limited to this and may be provided, for example, in the central parts of the cell holders 13. Such a structure allows the terminal fixing parts to be arranged at the positions where the rigidity is highest in the end plates, thereby enabling provision of the assembled battery which is difficult to break with the increased fastening force between the busbar and the external terminal cable at the fixing part.

As the above, the present invention will be briefly summarized. The assembled battery according to the present invention includes: a group of cells in which a plurality of cells, each having electrode terminals, is stacked; plate-shaped members arranged at ends of the group of cells; and cell holders 13 arranged between the plate-shaped members and the group of cells. Each of the cell holders 13 is provided with a terminal fixing part of the assembled battery, and each of the plate-shaped members has a fitting part to be fitted to the terminal fixing part. Such a structure allows the fixing parts to be accommodated in accommodating parts of conventional end plates or the housings, and thus the assembled battery can be downsized. Moreover, since the rotary torque applied to the fixing parts can be received by the accommodating parts of the end plates that are rigid enough, the fastening force between an end busbar and an external terminal cable at the fixing part can be increased.

Furthermore, in the assembled battery according to the present invention, the terminal fixing parts have a rectangular shape. Such a structure allows the contact area of the terminal fixing parts and the accommodating parts to be increased, and thus the connection between the terminal fixing parts and the accommodating parts can be further strengthened.

In the assembled battery according to the present invention, a head of a bolt or a nut is insert-molded in each the terminal fixing parts.

In the assembled battery according to the present invention, each of the terminal fixing parts is arranged on a cell holder 13 at a position facing an external terminal. Such a structure allows the distance between the external terminal and the terminal fixing part to be minimized.

Furthermore, in the assembled battery according to the present invention, each of the terminal fixing parts is arranged at the central portion of a cell holder 13. Such a structure allows the terminal fixing parts to be arranged at the positions where the rigidity is highest in the end plates, thereby enabling provision of the assembled battery which is difficult to break with the increased fastening force between the busbar and the external terminal cable at the fixing part.

Although the embodiments of the present invention have been described in detail above, the present invention is not limited to the above-described embodiments, and various modifications of design may be made without departing from the spirit of the present invention described in the claims. For example, the aforementioned embodiments are described in detail in order to facilitate understanding of the present invention, and thus the present invention is not necessarily limited to the one including all of the structures having been described. A part of a structure of one of the embodiments may be replaced with a structure of another embodiment. Also, a structure of one of the embodiments may be added with a structure of another embodiment. Moreover, a part of a structure of each of the embodiments may be added with, deleted of, or replaced with another structure.

REFERENCE SIGNS LIST 1 cell stack
2 end holder
2A isolation part
2B connection part
2C fixing part
3 end plate
3A accommodating part
4 side frame
5 intermediate busbar
6 end busbar
7 external terminal cable
8 unit cell
9 intermediate holder
9A isolation part
9B connection part
10 insert nut
11 bolt
12 cell stack
13 end holder
14 assembled battery housing
14A large part
14B small part
14C longitudinal surface
14D lateral surface
14E plate-shaped bottom
14F opening
14G accommodating part
15 bolt
A curved surface
Lw width of the fixing part
Lh protruding length of the fixing part
S1 contact area in the case of a structure with the curved surface
S2 contact area in the case of a rectangular

The invention claimed is:

1. An assembled battery comprising:
a group of cells in which a plurality of cells, each having electrode terminals, is stacked;
plate-shaped members arranged at ends of the group of cells; and
cell holders arranged between the plate-shaped members and the group of cells,
wherein each of the cell holders is provided with a terminal fixing part of the assembled battery, and each of the plate-shaped members has a recess on a top surface for inserting the terminal fixing part,
wherein one of the cell holders is in direct contact with one of the plate-shaped members, and
wherein the recess has a same shape as the terminal fixing part.

2. The assembled battery according to claim 1, wherein the plate-shaped members are end plates.

3. The assembled battery according to claim 1, wherein the plate-shaped members are a part of a housing.

4. The assembled battery according to claim 2, wherein the terminal fixing part has a rectangular shape.

5. The assembled battery according to claim 2, wherein a head of a bolt or a nut is inserted in the terminal fixing part.

6. The assembled battery according to claim 2, wherein the terminal fixing part is arranged on the cell holder at a position facing an external terminal of one of the cells.

7. The assembled battery according to claim 2, wherein the terminal fixing part is arranged at a central portion of the cell holder.

* * * * *